(12) United States Patent
Herubel et al.

(10) Patent No.: US 6,464,065 B2
(45) Date of Patent: Oct. 15, 2002

(54) METHOD AND APPARATUS FOR PUTTING ARTICLES INTO A QUEUE

(75) Inventors: Patrick Herubel, Ventabren (FR); Jean-Louis Pichon, Cabries (FR); Charles Palumbo, Les Milles (FR)

(73) Assignee: Cybernetix, Marseille (FR)

( * ) Notice: Subject to any disclaimer, the term of this patent is extended or adjusted under 35 U.S.C. 154(b) by 0 days.

(21) Appl. No.: 09/784,953

(22) Filed: Feb. 16, 2001

(65) Prior Publication Data
US 2002/0046923 A1 Apr. 25, 2002

(30) Foreign Application Priority Data
Aug. 31, 2000 (FR) .......................................... 00 11108

(51) Int. Cl.⁷ .............................................. B65G 47/31
(52) U.S. Cl. ................................ 198/460.1; 198/461.1; 198/347.4
(58) Field of Search ........................... 198/460.1, 461.1, 198/347.4

(56) References Cited

U.S. PATENT DOCUMENTS

| | | | | |
|---|---|---|---|---|
| 4,634,328 A | | 1/1987 | Carrell ....................... 414/117 |
| 5,141,097 A | * | 8/1992 | Oiry et al. ................ 198/460.1 |
| 5,165,520 A | * | 11/1992 | Herve et al. ............. 198/460.1 |
| 5,641,072 A | * | 6/1997 | Otake ....................... 198/460.1 |
| 5,755,336 A | * | 5/1998 | Rudy ....................... 198/367.1 |
| 5,918,723 A | | 7/1999 | Schuitema et al. ....... 198/347.4 |
| 5,950,800 A | | 9/1999 | Terrell et al. ................ 198/448 |
| 6,352,148 B1 | * | 3/2002 | Hindemuth .................. 198/415 |

FOREIGN PATENT DOCUMENTS

| | | |
|---|---|---|
| FR | 2576002 | 7/1986 |
| FR | 2581375 | 11/1986 |

* cited by examiner

Primary Examiner—Douglas Hess
(74) Attorney, Agent, or Firm—Ladas & Parry

(57) ABSTRACT

The present invention relates to a method of putting articles into a queue and apparatus enabling he method to be implemented. According to the invention, apparatus for putting articles into a queue comprises a plurality of parallel transfer conveyors which are suitable, together or separately, for transferring an article from the outlet of an inlet conveyor to the inlet of an outlet conveyor, between which and in line with which the transfer conveyors extend, and which includes a camera for observing articles on the inlet conveyor and a device for deriving article outline and identity data from images taken by the camera, and a device for selectively actuating the transfer conveyors as a function of the outline and identity data.

13 Claims, 5 Drawing Sheets

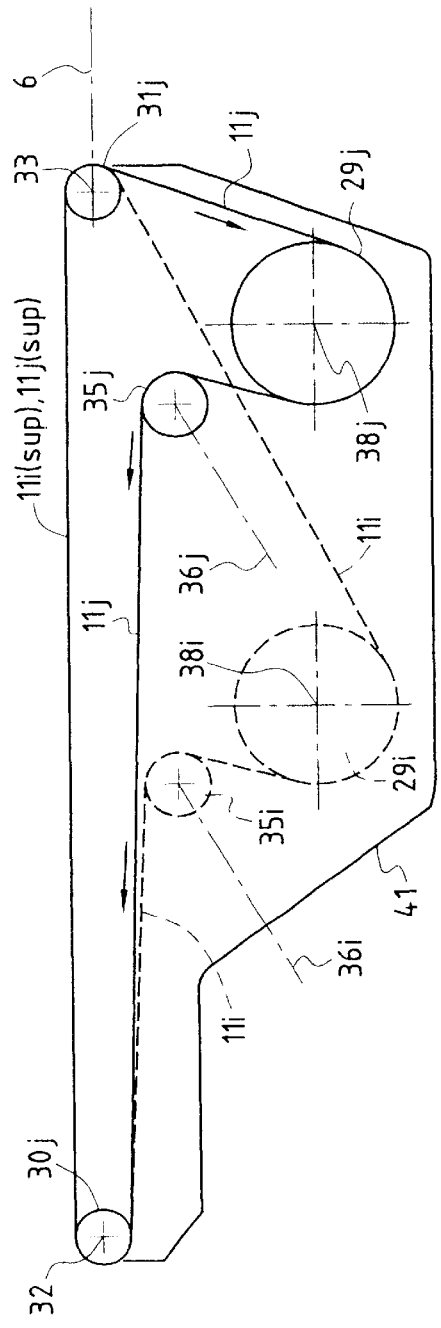
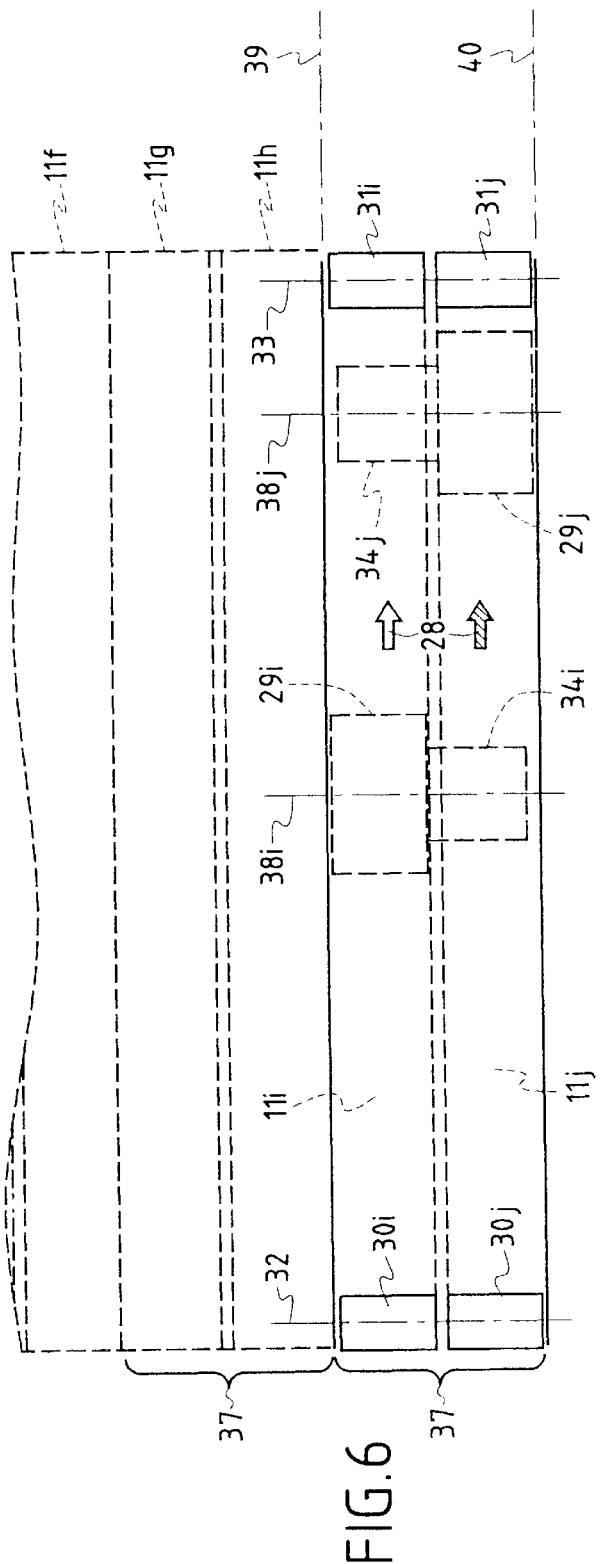
FIG.5
FIG.6

METHOD AND APPARATUS FOR PUTTING ARTICLES INTO A QUEUE

The present invention relates to a method of putting articles into a queue and to apparatus enabling the method to be implemented.

The invention applies particularly to separating parcels in bulk, e.g. postal parcels, so as to form a queue of parcels disposed sequentially (i.e. one behind another).

BACKGROUND OF THE INVENTION

U.S. Pat. Nos. 5,918,723 and 5,950,800 in particular disclose apparatus for "singulating" articles (i.e. putting them into a queue) in which the apparatus is essentially constituted by a plurality of conveyors extending perpendicularly relative to one another, and generally driven at increasing speeds going from an inlet towards and outlet of the apparatus, which conveyors are associated with ramps and/or static deflectors for guiding the articles.

Those apparatuses suffer from the drawback of causing the articles to drop on being transferred from one conveyor to another, and that can damage fragile articles; furthermore, the apparatus is generally bulky, because of the presence of deflectors and also the presence of return conveyors (recycling conveyors) which convey articles that have been separated out from the stream of articles treated by the apparatus to take them from the downstream end thereof back towards the upstream end; this gives rise to a loss of energy and also to the recycled articles being subjected to additional impacts on being delivered by the return conveyor back to the inlet to the apparatus.

In above-mentioned document U.S. Pat. No. 5,950,800, the apparatus includes a conveyor sloping at an angle of at least 25°, thereby causing articles which are piled up one on another to drop so as to ensure that the articles delivered at the outlet from the conveyor occupy a single layer only.

Document U.S. Pat. No. 4,634,328 discloses apparatus for putting articles into a queue, which apparatus comprises:

two conveyors for conveying articles, namely an inlet conveyor and an outlet conveyor, which conveyors are disposed substantially in line one with the other;

a plurality of parallel fingers which can be displaced by actuators and which extend vertically between the two conveyors so that depending on their position they can allow or prevent articles from passing from one conveyor to the other;

a camera disposed to observe articles present on an inlet conveyor;

a computer algorithm for determining the profiles of the articles observed by the camera;

a robot suitable for pushing articles selectively one by one from the first conveyor to the second; and a controller connected to the camera, to the robot, and to the finger-displacing actuators so as to respond to the profiles of the articles by controlling displacement of the fingers in order to bring them into a position in which they allow one article to pass while preventing other articles from passing, and then to control the pusher robot to transfer the articles one by one from the first conveyor to the second.

OBJECTS AND SUMMARY OF THE INVENTION

An object of the invention is to propose a system for separating articles that is simpler than the apparatus described in the above document.

An object of the invention is to propose a system for putting articles into a queue that remedies the drawbacks of known methods and apparatuses, at least in part.

In a first aspect, the present invention consists in providing apparatus that comprises a plurality of parallel transfer conveyors which are suitable, together or separately, for transferring an article from the outlet of an inlet conveyor to the inlet of an outlet conveyor, between which and in line with which the transfer conveyors extend, and which includes a camera for observing articles on the inlet conveyor and means for deriving article outline and identity data from images taken by the camera, and means for selectively actuating the transfer conveyors as a function of said outline and identity data.

In other words, the invention consists in using a "multibelt" conveyor interposed between an inlet conveyor and an outlet conveyor and having a plurality of belts extending parallel and side by side, each forming a transfer conveyor; each belt is suitable for being driven individually under the control of an electronic control unit, as a function of data that results from identifying the outline of an individualized article, which outline is obtained by processing one or more images taken by a camera for observing the articles present on the inlet conveyor; an individualized article selected from a plurality of articles presented broadside by the inlet conveyor at the inlet to the multibelt conveyor is transferred by actuating the belts which lie in line with said individualized article differently compared with how the belts are actuated which do not lie in line with said individualized article; this "differential" actuation of the various parallel belts of the multibelt conveyor can be performed in two fundamentally different manners:

either by actuating said belts that lie in line with the selected individualized article while keeping the other belts stationary (on/off operation);

or else by actuating said belts that lie in line with the selected individualized article at a first transfer speed while still actuating the other belts at least at a second transfer speed of a value that is different from that of the first transfer speed, and in particular is less than said first transfer speed.

These two modes of actuation can be combined.

By means of this system, when a plurality of articles are presented side by side (broadside-on) at the outlet from the inlet conveyor, said individualized article selected from said plurality of articles is detached (separated) from said plurality on being transferred by the multibelt conveyor to the outlet conveyor so that it is presented at the inlet of the outlet conveyor before any other article in said plurality; a second article in said plurality is then selected and the belts are then controlled to move differentially in a manner that is adapted to the position and to the outline of said second selected article, as determined from the image of the transverse profile of the group of articles remaining on said first conveyor, thus enabling the second article to be separated from the plurality of articles present on the inlet conveyor in the same manner as the first selected article was separated therefrom.

With these operations being repeated as many times as there are individualized articles present at the inlet to the multibelt conveyor, it is possible to separate the articles (longitudinally) so that the multibelt transfer conveyor presents these articles one after another to the outlet conveyor; where appropriate, they can then be placed in a queue (one behind the other) e.g. by using a vertical deflector extending in a plane that slopes a little relative to the vertical longitudinal plane of the outlet conveyor.

Thus, in another aspect, the invention consists in a method of separating a group of articles in bulk that are presented broadside-on on an inlet conveyor, which method comprises:

taking an image of the group of articles;

determining the number of articles in the group and the outline of each article by computation on the basis of the image, thereby making it possible to determine the position and the width of the base of each of the articles in a transverse vertical plane; and controlling the belts or parallel groups of belts of a multibelt conveyor that extends said inlet conveyor to advance in non-uniform manner (at different speeds and/or at different times) so as to correspond to each of the individualized articles respectively, in such a manner that the articles in the group of articles are presented at the outlet from the multibelt conveyor with longitudinal offsets between articles forming successive pairs of articles.

The mean speed at which articles are conveyed is preferably maintained at a value lying in a range going form 0.1 meters per second (m/s) to 2 m/s.

The method and the apparatus of the invention make it possible to avoid dropping articles and to avoid recycling them.

The system of the invention advantageously replaces the system described in U.S. Pat. No. 4,634,328; in the apparatus of the invention it matters little if an article for sorting presents density that is not uniformly distributed in three dimensions (as is frequently the case for packaged articles): by conveying a non-uniform article on a plurality of adjacent belts of a multibelt conveyor with the article resting on said belts, it is possible to ensure that the article is conveyed with rectilinear movement in translation along the longitudinal axis of the multibelt conveyor; in general, such movement is unlikely to cause the conveyed article to bear against adjacent articles in the group, where that might otherwise cause the articles that bear against one another to rotate (and/or move sideways).

In contrast, the pusher robot of the above-mentioned patent is not only complex in structure and to control, but it is naturally confronted with difficulties when controlling the path of an article that it is pushing: it is not possible from the image of a non-uniform article to deduce the position of its center of gravity or to deduce the characteristics (modulus and direction) of the resultant of the friction forces opposing sliding of the article on the member (conveyor belt) that is supporting the article; consequently, when using the apparatus as described in U.S. Pat. No. 4,634,328, the thrust force imparted by the robot tends to cause the article to rotate and/or tilt, thereby making it liable to interfere with (strike) the fingers interposed between the two conveyors; in addition, the path followed by the article pushed by the robot is modified by the reaction forces that result from the pushed article bearing against the fingers and/or against other articles surrounding it.

Furthermore, the use of a multibelt conveyor makes it easier to transfer articles that are deformable (such as newspapers) and to transfer articles that might roll, in particular articles that are approximately cylindrical or spherical in shape, by giving them a conveyor path that is determined and controlled and in longitudinal translation without the article being turned or pivoted, unlike the pusher robot.

BRIEF DESCRIPTION OF THE DRAWINGS

Other characteristics and advantages of the invention appear from the following description which refers to the accompanying drawings showing preferred embodiments of the invention by way of non-limiting example.

FIG. 5 is a diagrammatic side view of a second embodiment of a multibelt conveyor of the invention.

FIG. 6 is a fragmentary diagrammatic plan view of the FIG. 5 conveyor.

MORE DETAILED DESCRIPTION

Figure 1:
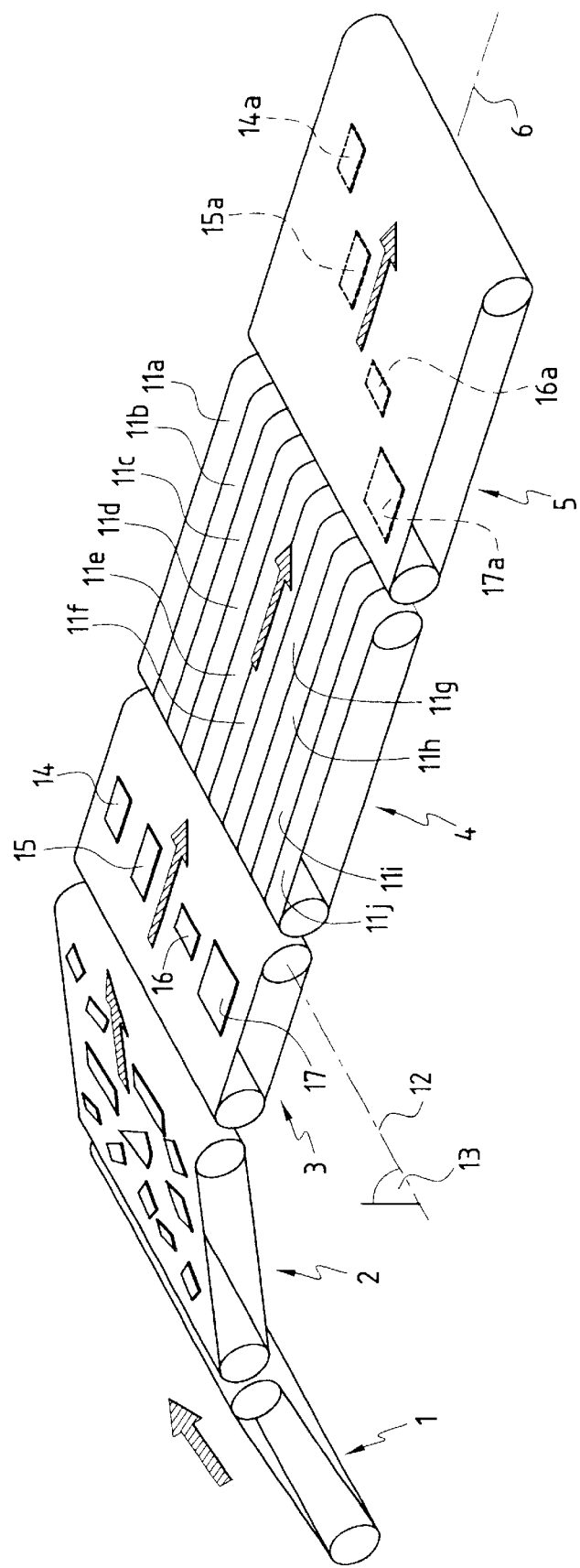
FIG. 1 is a simplified perspective view showing the main mechanical conveyor components of apparatus of the invention.
Figure 2:
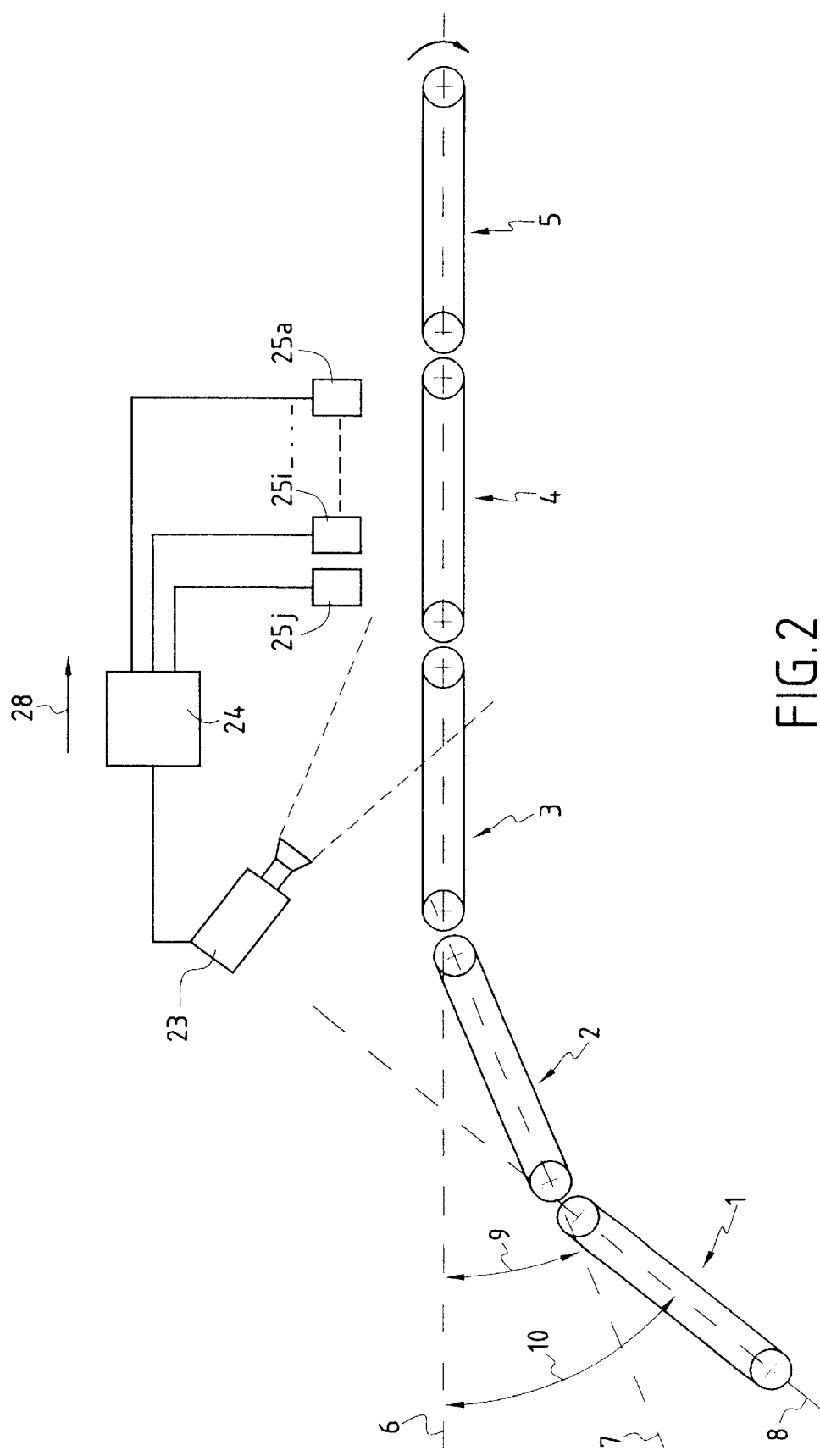
FIG. 2 is a diagrammatic side view of the main components of apparatus of the invention and shows how they are interconnected.

With reference to FIGS. 1 and 2, the apparatus of the invention comprises five conveyors that are disposed so as to be substantially juxtaposed in successive pairs:

a single-belt conveyor 1 whose longitudinal axis 8 slopes at an angle 10 of about 30° relative to a horizontal axis 6; this conveyor causes the articles it is transporting to be spread into a single layer because of the way its own longitudinal axis slopes;

a single-belt conveyor 2 whose longitudinal axis 7 is inclined at an angle 9 of about 25° relative to a horizontal axis 6; this conveyor is driven (by a motor not shown) at a speed which is approximately double that of the conveyor 1 so as to increase the longitudinal spacing between articles on being transferred from conveyor 1 to conveyor 2; this "spreads out" the layer of conveyed articles;

a single-band conveyor 3, referred to as the "inlet" conveyor, which has its inlet receiving the articles that tilt off the conveyor 2, and which extends along the axis 6;

a conveyor 4 which comprises ten narrow belts 11a to 11j that are juxtaposed side by side and that extend parallel to the axis 6; this multibelt conveyor 4 serves to convey the articles presented at the outlet from the inlet conveyor 3 to the inlet of an outlet conveyor 5 and it offsets them longitudinally relative to one another because of the relative speeds that are imparted to the belts 11a–11j as a function of data extracted from a transverse image of the articles present on the conveyor 3; and a single-belt conveyor 5, referred to as the "outlet" conveyor, which likewise extends along the axis 6.

Figure 3:
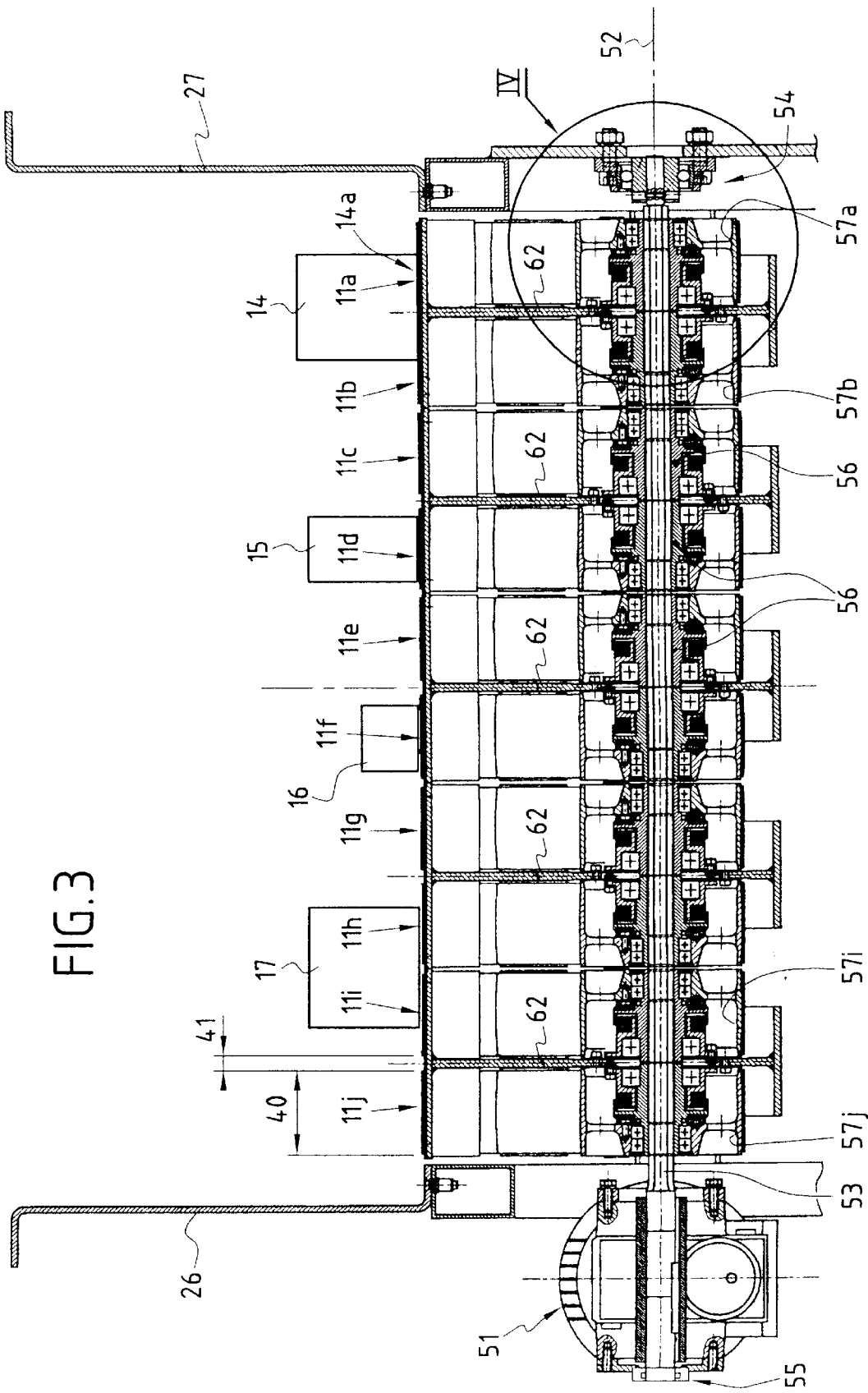
FIG. 3 is a section view in a transverse vertical plane through a multibelt conveyor used for longitudinally offsetting articles presented broadside-on at the outlet from the inlet conveyor in apparatus of the invention.

In addition to static supports and guides such as those referenced 26 and 27 in FIG. 3, the apparatus further comprises an electronic unit 24 for selectively controlling actuators 25a to 25j respectively associated with each of the belts 11a to 11j of the multibelt conveyor 4; to do this, the unit 24 is connected to the actuators 25a–25j, and also to a camera 23 which provides the unit 24 with images in a transverse vertical plane 13 of articles (14 to 17 FIG. 1) arriving broadside-on at the outlet from the conveyor 3, or with images of their cast shadows.

The unit 24 is provided or associated with means for determining the position along a transverse axis such as 12 and the width along said axis of each of the articles 14 to 17;

these means implement known image processing algorithms, in particular an outline-extracting algorithm and an algorithm for isolating and/or recognizing the shapes of the articles observed by the camera.

Figure 4:
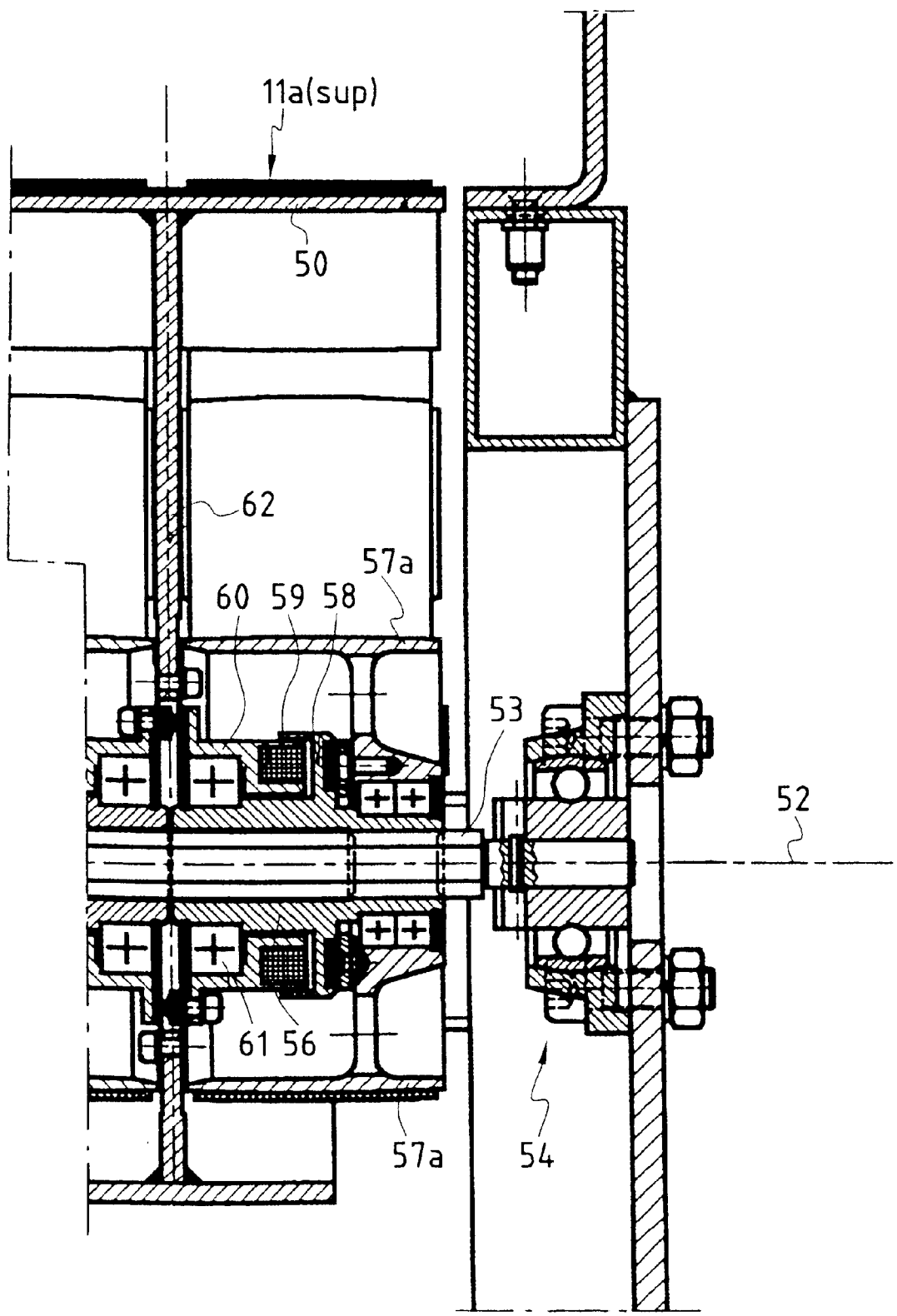
FIG. 4 is on a larger scale and shows a detail marked IV in FIG. 3.

The first embodiment of the multibelt conveyor as shown in FIGS. 3 and 4 is particularly intended for operating under the control of the unit 24 to drive the belts 11a to 11j selectively in on/off mode in application of the following sequence:

driving two adjacent belts 11a and 11b extending in line with the base 14, of article 14 at a speed 28 until it is detected that the article 14 has passed onto the following conveyor (referenced 5), while the other belts 11c to 11j are kept stationary; and then driving the belt 11d to transfer the article 15 at the speed 28 while the belts 11a and 11b continue to be driven and the belts 11c and 11e to 11j remain stationary; then after the article 15 has passed onto the following conveyor (referenced 5):

driving the belt 11f to transfer the article 16 at the speed 28 with the belts 11a, 11b, and 11d continuing to be driven while the belts 11c, 11e, and 11g to 11j remain stationary; and then after the article 16 has passed onto the following conveyor (referenced 5):

driving the belts 11h and 11i to transfer the article 17, the belts 11a, 11b, 11d, and 11f continuing to be driven while the belts 11c, 11e, 11g, and 11j are kept stationary, until the article 17 passes onto the conveyor 5.

When the four articles conveyed in this manner by the conveyor 4 reach the inlet to the conveyor 5, they are applied thereto with longitudinal spacing as shown for articles 14a to 17a in FIG. 1.

In this embodiment, the belts 11a to 11j are driven by a common motor via respective clutches as described below so their displacement speeds 28 are equal; in the variant shown in FIGS. 5 and 6, the belts can be driven at different speeds 28, each belt (such as 11i, 11j) being respectively associated with its own drive motor 34 (such as 34i, 34j) which is actuated under the control of the unit 24 (FIG. 2).

In both embodiments, each narrow belt such as 11j is guided by four wheels (or pulleys):

two wheels 30j, 31j are mounted to rotate freely about two respective transverse axes 32 and 33 parallel to the axis 12 (FIG. 1), with the top strands 11isup and 11jsup of the belts 11i and 11j extending so that they are coplanar and in line both with the top strand of the inlet conveyor 3 and with the top strand of the outlet conveyor 5;

a freely rotating guide wheel (such as 35i, 35j) for guiding the bottom strand of the belt, which guide wheel is mounted free to move in translation along an axis (such as 36i, 36j) and is subjected to the action of a return spring so as to keep the belt under tension; and a driving wheel (such as 29i, 29j) driven by a respective one of said motors (such as 34i, 34j) to drive the belt by friction.

As shown in FIGS. 5 and 6, the conveyor has a plurality of identical modules 37 that are juxtaposed side by side, each comprising:

two adjacent narrow belts such as 11i and 11j, together with said four wheels associated with each belt;

two motors such as 34i, 34j for directly driving the driving wheels 29i, 29j whose respective axes of rotation 38i, 38j are parallel and are offset in the plane of FIGS. 5 and 6 so that they occupy a space that is defined between two longitudinal vertical planes whose positions are identified in the plan view of FIG. 6 by chain-dotted lines 39 and 40, thus making it possible (as shown in FIG. 6) to bring two modules 37 together side by side, thereby making a compact conveyor having an even number of belts (at least four); and an open-topped casing 41 which protects the mechanisms situated beneath the top strands of the belts.

This provides a structure that is modular, compact, and of low cost.

The belts 11a–11j of the multibelt conveyor are preferably separated transversely by gaps of width 41 such that the gap width lies in a range 0.07 times to 0.3 times the belt width 40.

Also preferably, the ratio of the total length of the top strand to the belt width 40 of the belts 11a to 11j lies in the range 5 to 25.

With reference to FIGS. 3 and 4, the apparatus has a stationary horizontal metal sheet 50 with the top strands of the multibelt conveyor sliding on the top face thereof.

A motor 51 common to all ten belts is fixed on a support (not shown) and via a gear 55 it rotates a fluted shaft 53 extending along a horizontal transverse axis 52 and mounted to rotate in an end bearing 54.

The fluted shaft carries ten wheels 56 mounted opposite ways round in pairs along the shaft; each wheel 56 has a friction disk 58 on the axis 52 and suitable for "sticking" to an adhesion surface fitted to a respective drive wheel 57a .... 57j for driving each of the belts 11a ... 11j; small amplitude displacement of each wheel 56 parallel to the axis 52 serves to provide contact and friction drive of a wheel such as 57a by the clutch disk 58 of the wheel 56 under drive from a coil 59 controlled by the unit 24 (FIG. 2) so as to apply a force on the disk that results from the electromagnetic field generated by the coil; the coil is fixed on a bushing 60 that receives a ball bearing 61 for the wheel 56; the bushing is mounted to be stationary, being fixed beneath the metal sheet 50 by a support 62; another ball bearing 62 allows the wheel 56, 58 to rotate freely under continuous drive from the shaft 53 whereas drive of the wheel 57 is engaged optionally by the electromagnetic clutch 58–59.

What is claimed is:

1. Apparatus for putting articles into a queue, the apparatus comprising a plurality of parallel transfer conveyors which are suitable, together or separately, for transferring an article from the outlet of an inlet conveyor to the inlet of an outlet conveyor, between which and in line with which the transfer conveyors extend side by side, and which includes a camera for observing articles on the inlet conveyor and means for deriving article outline and identity data from images taken by the camera, and means for selectively and individually actuating the transfer conveyors as a function of said outline and identity data.

2. Apparatus according to claim 1, having two sloping single-belt conveyors extending successively upstream from the transfer conveyors, and which are controlled to cause articles to be spread out into a single layer and to cause them to be spaced apart longitudinally.

3. Apparatus according to claim 1, having at least four transfer conveyors of the same length with their top strands being coplanar.

4. Apparatus for transporting and separating articles, the apparatus comprising a multibelt conveyor having a plurality of belts extending parallel and side by side, each forming a transfer conveyor, each belt being suitable for being driven individually under the control of an electronic control unit as a function of data that results from identifying the outline of an individualized article, which outline is obtained by processing one or more images taken by a camera for observing the articles presented broadside-on at the inlet of the multibelt conveyor, an individualized article selected from a plurality of articles being selectively transferred by actuating the belts that are in line with said individualized article differently from the belts which do not lie in line with said individualized article.

5. Apparatus according to claimed 4, wherein said multibelt conveyor has at least four belts of the same length with top strands being coplanar.

6. Apparatus according to claim 5, having a respective motor associated with each belt to drive it by friction via a respective pulley.

7. Apparatus according to claim 5, having a respective electromagnetically controlled clutch associated with each belt to enable a belt to be driven selectively by a motor that is common to a plurality of belts.

8. Apparatus according to claim 4, having two sloping single-belt conveyors extending successively upstream from the multibelt conveyor, and which are controlled to cause articles to be spread out into a single layer and to cause them to be spaced apart longitudinally.

9. Apparatus according to claim 4, in which the belts of the multibelt conveyor are spaced apart transversely by gaps of width having a ratio to the width of the belts lying in the range 0.07 to 0.3.

10. Apparatus according to claim 4, in which the ratio of the length of the top strands of the belts to the width of the belts lies in the range 5 to 25.

11. A method of separating a group of articles in bulk that are presented broadside-on on an inlet conveyor, the method comprising:

taking an image of the group of articles;

determining the number of articles in the group and the outline of each article by computation on the basis of the image, thereby making it possible to determine the position and the width of the base of each of the articles in a transverse vertical plane; and controlling the belts or parallel groups of belts of a multibelt conveyor that extends said inlet conveyor to advance in non-uniform manner (at different speeds and/or at different times) so as to correspond to each of the individualized articles respectively, in such a manner that the articles in the group of articles are presented at the outlet from the multibelt conveyor with longitudinal offsets between articles forming successive pairs of articles.

12. A method according to claim 11, in which the mean speed at which articles are conveyed is maintained at a value lying in the range 0.1 m/s to 2 m/s.

13. A method according to claim 12, in which the belts of the multibelt conveyor are actuated at different speeds.

* * * * *